United States Patent
Hauser

(10) Patent No.: US 9,285,869 B2
(45) Date of Patent: Mar. 15, 2016

(54) SYSTEM, METHOD AND COMPUTER READABLE MEDIUM FOR INVOKING APPLICATIONS

(75) Inventor: Robert R Hauser, Frisco, TX (US)

(73) Assignee: SUBOTI, LLC, Frisco, TX (US)

(*) Notice: Subject to any disclaimer, the term of this patent is extended or adjusted under 35 U.S.C. 154(b) by 1543 days.

(21) Appl. No.: 12/435,778

(22) Filed: May 5, 2009

(65) Prior Publication Data

US 2010/0287567 A1     Nov. 11, 2010

(51) Int. Cl.
*G06F 9/46*   (2006.01)
*G06F 3/01*   (2006.01)

(52) U.S. Cl.
CPC ............ *G06F 3/01* (2013.01); *G06F 2203/011* (2013.01)

(58) Field of Classification Search
None
See application file for complete search history.

(56) References Cited

U.S. PATENT DOCUMENTS

| | | |
|---|---|---|
| 6,848,108 B1 | 1/2005 | Caron |
| 7,051,042 B2 | 5/2006 | Krishnaprasad et al. |
| 8,112,671 B1 * | 2/2012 | Di Fabbrizio et al. ....... 714/38.1 |
| 2002/0002599 A1 * | 1/2002 | Arner et al. .................... 709/219 |
| 2004/0141508 A1 * | 7/2004 | Schoeneberger et al. ..... 370/401 |
| 2005/0144441 A1 * | 6/2005 | Govindarajan ............... 713/160 |
| 2007/0258438 A1 * | 11/2007 | Bennett ......................... 370/352 |
| 2008/0276186 A1 * | 11/2008 | Feduszczak et al. .......... 715/762 |
| 2010/0017384 A1 * | 1/2010 | Marinescu ........................ 707/5 |
| 2010/0070620 A1 * | 3/2010 | Awadallah et al. ........... 709/224 |

OTHER PUBLICATIONS

Florian Mueller, Andrea Lockerd, "Cheese: Tracking Mouse Movement Activity on Websites, a Tool for User Modeling", Conference on Human Factors in Computing Systems, CHI '01 extended abstracts on Human factors in computing systems, Seattle, Washington, Session: Short talks: of mice and measures, pp. 279-280, Year of Publication: 2001, ISBN: 1-58113-340-5, MIT Media Lab, 2001, Cambridge, MA 02139 USA.

* cited by examiner

*Primary Examiner* — Umut Onat

(57) ABSTRACT

When a user clicks a widget, such as a button, to invoke a widget behavior in a web page, an overlay module may delay the invoking of the widget behavior while executing a stimulatory effect. The stimulatory effect may be a visual effect, such as a gradual fill of the button, that stimulates the user to provide a re-click. A re-click can cause the stimulatory effect to conclude and to invoke the widget behavior. The re-click event, based on human impatience, may be determined to be an indicator of a human user.

17 Claims, 6 Drawing Sheets

SYSTEM, METHOD AND COMPUTER READABLE MEDIUM FOR INVOKING APPLICATIONS

FIELD OF THE INVENTION

This disclosure relates to a system, method and computer readable medium for invoking applications from a web page.

BACKGROUND OF THE INVENTION

In the Applicant's co-pending application Ser. No. 12/435,740, the entire contents of which are explicitly incorporated herein by reference, there is described a system and method for determining whether an interaction with a webpage at a client browser is a human dependent interaction. In this system, event streams generated at a user interface are analyzed and compared with previously recorded event streams from known human interactions and known non-human interactions. The comparison indicates whether the current interaction is likely to be a human dependent interaction. In the Applicant's co-pending application Ser. No. 12/435,751, the entire contents of which are explicitly incorporated herein by reference, the process of analyzing an event stream is enhanced by invoking effects on the user interface and then analyzing the resultant event stream to see how a user responded to an invoked effect. Responses to the invoked effects may be characteristically human or characteristically non-human.

What is required is a system, method and computer readable medium that can invoke additional behavior at the user interface without substantially affecting existing applications running in web pages nor affect legitimate web crawlers or computer assisted humans.

SUMMARY OF THE INVENTION

In one aspect of the disclosure, there is provided a method for invoking a response behavior in a web page. The method comprises recording an application invoking event for an application, delaying invoking of the application, and providing a stimulatory effect during the delay. The stimulatory effect is configured to invoke a response behavior.

In one aspect of the disclosure, there is provided a web server configured to generate a web page and provide the web page to a client browser. The generated web page comprises web page content comprising at least one widget and at least one widget overlay module. The widget overlay module is configured to locate at least one widget within the web page content, and reconfigure event handlers on the at least one widget to first invoke an overlay event handler.

In one aspect of the disclosure, there is provided a computer-readable medium comprising computer-executable instructions for execution by a processor, that, when executed, cause the processor to receive an application invoking event, cache the application invoking event, run a stimulatory effect, conclude the stimulatory effect, and provide the cached application invoking event to an application event handler.

BRIEF DESCRIPTION OF THE DRAWINGS

Reference will now be made, by way of example only, to specific embodiments and to the accompanying drawings in which.

DETAILED DESCRIPTION OF THE INVENTION

Web pages typically incorporate visual building blocks known as widgets. Widgets include elements of a Graphic User Interface (GUI) such as buttons, radio buttons, checkboxes, windows, list boxes, dialogue boxes, etc, though a person skilled in the art will recognize that widgets may be represented in many other forms. Widgets provide an interaction point for a user to interact with a web page, e.g. to provide or manipulate data. Application event handlers may be registered within the web page to determine when widgets are used by an end-user during an interaction with the web page. In accordance with an embodiment of the disclosure, certain widgets of an existing application may dynamically be given "overlays" such that the original behavior of the widget is preserved but time delayed. During an overlay induced time delay, a stimulatory effect, e.g. visual, audio or other indicator, is presented to the user to stimulate or entice the user to generate the same event again in order to speed up the invoking of the actual application behavior.

Figure 1:
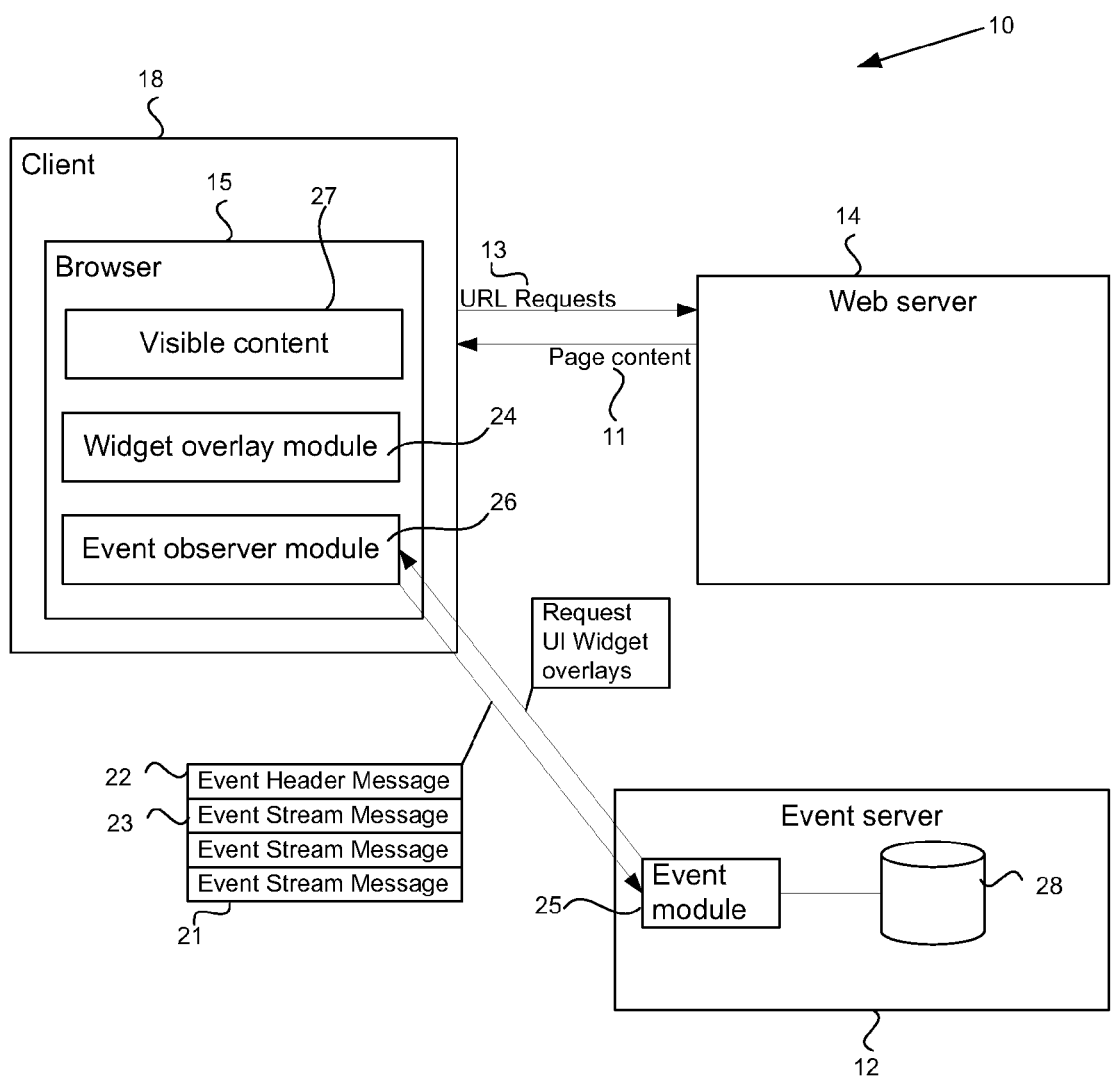
FIG. 1 illustrates a system for providing widget overlays.

A system in accordance with an embodiment of the disclosure is depicted in FIG. 1. In the system 10, a client 18 provides web page requests 13 to a web server 14, in response to which, the web server 14 provides page content 11 for display in a browser 15 of the client 18. Typically, the web page 11 will include visible content 27 which may include any number of widgets.

In typical webpage protocols, a document object model (DOM) of a webpage structure may include a document, a body and several elements, including elements embedded within each other. Events, in particular user triggered events such as mouse movements, cursor movements, mouse clicks or keyboard events may be generated at various locations on the page. Application code, e.g. JAVASCRIPT applications, running in the webpage environment may register event handlers on various web page objects. The event handlers may handle events in a variety of ways. A first event handling method is referred to as event capturing. Event capturing provides an event first to the top most object in the web page hierarchical structure, i.e. DOM, and onward in a descending fashion as follows:

DOCUMENT→BODY→ELEMENT A→ELEMENT B

Event bubbling provides an event first to the bottom most object and onward in an ascending fashion as follows:

ELEMENT B→ELEMENT A→BODY→DOCUMENT

In the system 10, the web server 14 is modified such that the web page content 11 provided to the client 18 includes an event observer module 26 and a widget overlay module 24, both of which may be provided as appropriate code or scripts that run in the background of the client's browser 15. In one embodiment, code for providing the event observer module 26 and the widget overlay module 24 is provided to the web server 14 by a third party service, such as provided from an event server 12, described in greater detail below.

The event observer module 26 and the widget overlay module 24 may be provided as code embedded in a web page 11 from the web server 14. Alternatively or in addition, the event observer module 26 and the widget overlay module 24 may be provided as a link back to the web server 14 or a third party server, e.g. event server 12, for the resource containing the code which the web browser will fetch as part of loading the web page.

The event observer module 26 observes events generated in a user interaction with the web page 11 at the client 18. The event observer module 26 records events generated within the web browser 15, such as mouse clicks, mouse moves, text entries etc., and generate an event stream 21 including an event header message 22 and one or more event stream messages 23. It will be apparent to a person skilled in the art that terms used to describe mouse movements are to be considered broadly and to encompass all such cursor manipulation devices and will include a plug-in mouse, on board mouse, touch pad, pixel pen, eye-tracker, etc.

The event observer module 26 provides the event stream 21 to the event server 12. The event server 12 includes an event module 25 and a suitable data store 28, which though shown in FIG. 1 within the event server 12, may also be provided as an offsite data store.

Figure 2:
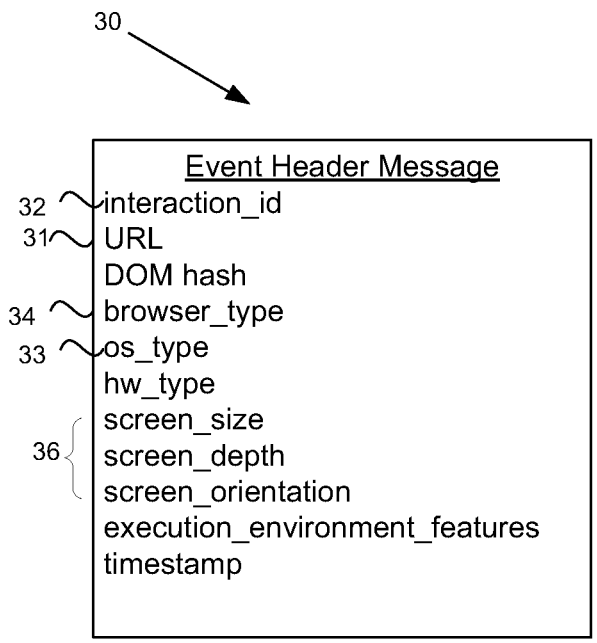
FIG. 2 illustrates an example of an event header message.
Figure 3:
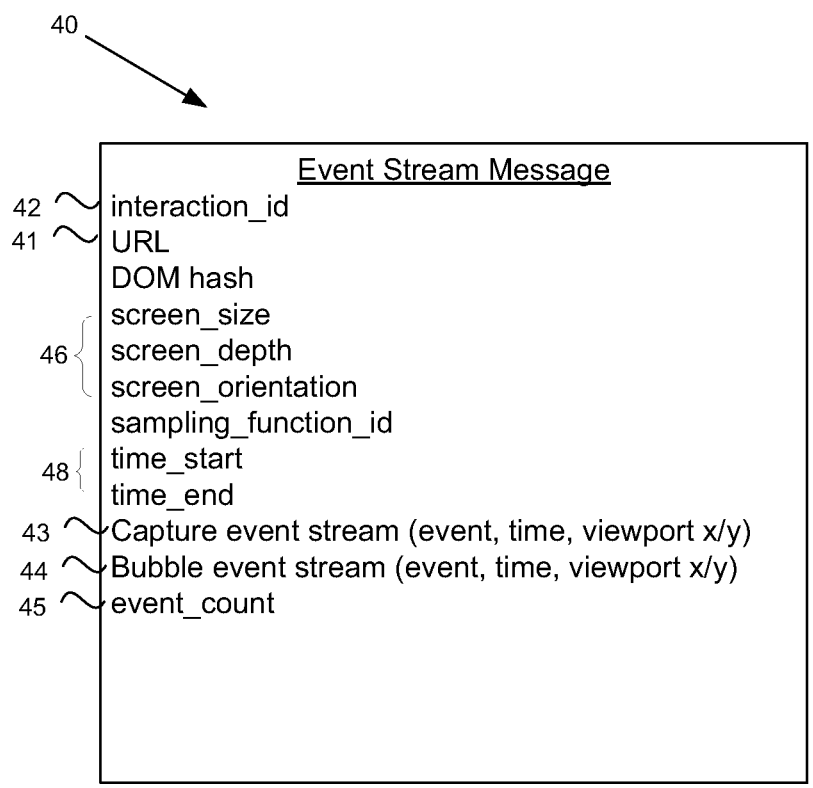
FIG. 3 illustrates an example of an event stream message.

An example of an event header message 30 is illustrated in FIG. 2 and an example of an event stream message 40 is illustrated in FIG. 3. The messages 30, 40 show a number of components that can be included, though in various embodiments, not all of these components may be required and additional components may be added. Primarily, an Interaction_ID 32, 42 uniquely identifies an interaction between the client 18 and the web server 14 and aids to identify the particular event stream 21. The event header message 30 and the event stream message 40 may also identify the Uniform Resource Locator (URL) 31, 41. Fixed parameters such as the operating system 33 and browser type 34 may form part of the event header message 30. Screen parameters 36, 46 such as the screen size, depth and orientation may be included in either or both of the event header message 30 or the event stream message 40. A capture event stream 43 and a bubble event stream 44 specifies the events recorded in respective event capture and bubbling phases during the web page interaction. Each event may be indicated by the event type, time and x/y location relative to the viewport. Not all web browser types support event capture, and thus the capture event stream 43 may be empty. Where required, events missing from the event bubble stream may be inferred, for example as described in the Applicant's co-pending application Ser. No. 12/435,748, the entire contents of which are explicitly incorporated herein by reference. An event_count field 45 may indicate the total number of unique events observed by the event observer module including those events not included in the event stream message 40 due to a current event sampling function excluding them. Timing parameters 48 may indicate the relevant period over which the event stream message 40 is current.

The event observer module 26 passes the event stream 21 to the event module 25 of the event server 12. In the embodiment illustrated in FIG. 1, the event stream 21 are provided directly to the event module 25. However, the event stream 21 may also be provided indirectly, e.g. via the web server 14.

When the web page is loaded into the web browser 15, the widget overlay module 24 finds applicable widgets in the web page and reconfigures the event handlers on the widgets to invoke the overlay handler first. The default mode of the overlay handlers is to pass the event through to the application handler with no delay.

During an interaction with the web page 11, a user navigates the web page 11 and may enter content where appropriate, such as in the HTML form elements. During this interaction, events are generated and recorded by the event observer module 26. Events may include mouse clicks, mouse moves, key strokes etc. Periodically, the event observer module 26 formulates an event stream message 23 and provides the event stream message 23 to the event server 12. Analysis of the event stream messages may probabilistically determine an event generator type for the event streams (e.g. human, non-human, computer assisted human, etc.) as described in the Applicant's co-pending application Ser. No. 12/435,740 referenced above. In one embodiment, the analysis may trigger a requirement for further testing, such as by a non-transparent effect, as described in the Applicant's co-pending application Ser. No. 12/435,751 referenced above. In one embodiment, a non-transparent effect may by performed by a widget overlay and thus an overlay request may be sent from the event server 12 to the widget overlay module 24.

Figure 4:
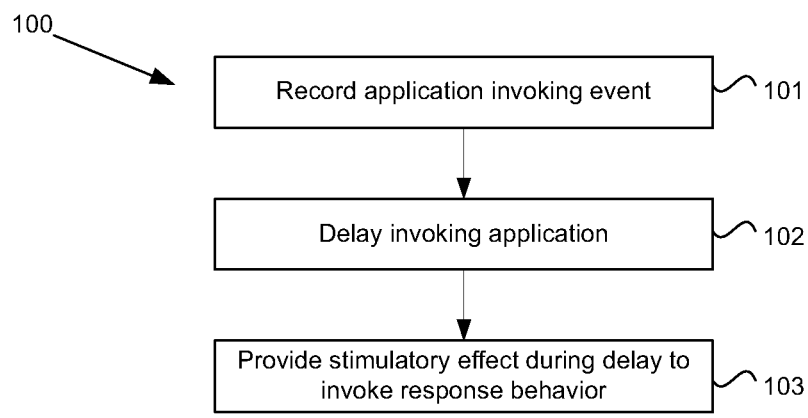
FIG. 4 illustrates a method for invoking a response behavior in a web page.

On receipt of an overlay request, the overlay handlers are set to invoke an overlay effect. When an application invoking event is detected, the overlay handler invokes the overlay effect, thereby delaying the passing of the application invoking event to the application event handlers. In one embodiment, the overlay effect may be invoked probabilistically or randomly such that overlay effect is only occasionally invoked. A process for invoking a response behavior is illustrated in the flowchart 100 of FIG. 4. At step 101, an application invoking event is recorded and delayed at step 102 while a stimulatory effect is run 103 in order to stimulate a further response behavior.

Figure 5:
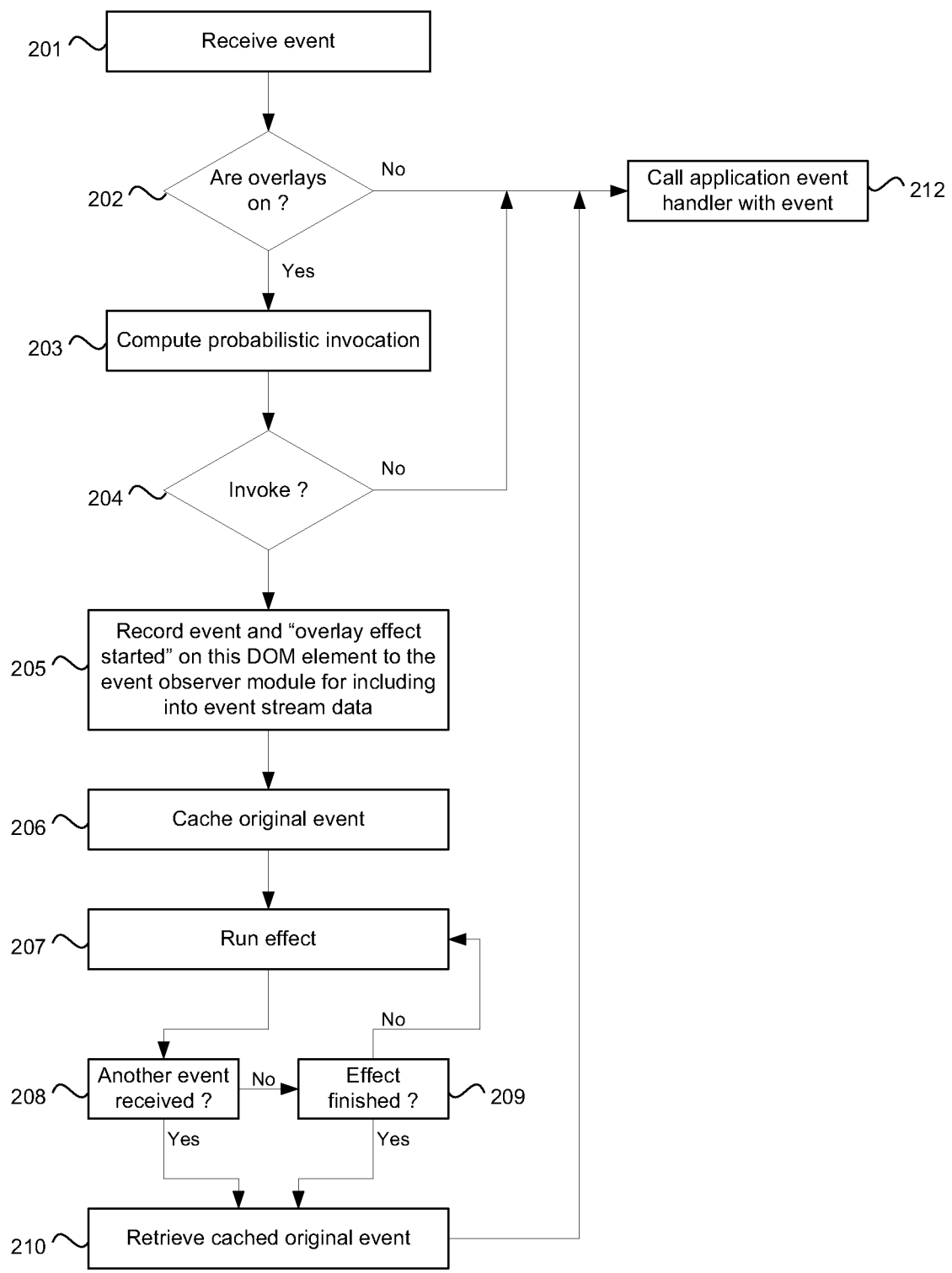
FIG. 5 illustrates a flowchart depicting a widget overlay module operation.

An event handler operation of the widget overlay module is illustrated in FIG. 5. At step 201, the overlay widget module 24 receives an event. If the overlays are not set, as determined at step 202, then the event is passed to the application event handler 212 and the widget behavior is immediately performed. If overlays are on, then a probabilistic invocation of an overlay effect is computed at step 203. If the overlay effect is not to be invoked, as determined at step 204, then the event is passed to the application event handler 212. However, if the overlay effect is to be invoked, then at step 205, the event is recorded to the event observer module 26 for inclusion into the event stream data together with an "overlay effect started" indicator that indicates an overlay effect has started on this DOM element. The original event is then cached 206. At step 207, the invoked stimulatory effect is run. While the invoked effect is running, if additional events are received 208, then they are observed by the event observer module 26 and placed in the event stream data. Once additional events are received 208 or the effect concludes 209, the original event is retrieved from the cache 210 and passed to the application event handler 212. In an alternate embodiment one of the additional events may be passed to the application event handler instead of the original event.

The event stream recorded while the event overlay is on may be analyzed by the event module 25 of the event server 12 to determine whether an expected response behavior was observed in response to the invoked effect. Further details of determining responses to invoked effects are described in the Applicant's co-pending application Ser. No. 12/435,751 referenced above.

Typically, the event observer module will record and report a multitude of event types including mouse clicks, mouse moves, text entries etc. For the purpose of analyzing responses to overlay effects, the event handlers may register only further application invoking events, such as mouse click events and similar.

The overlay event handlers do not interfere with the event handlers used by the event observer module 26. In one embodiment, the overlay event handlers and the event handlers of the event observer module 26 may be embodied in a single handler function. Because the original event is cached while the invoked effects are run and later provided to the application event handler, the provision of the invoked effects does not otherwise affect the operation of the web page and its applications.

In particular embodiments, widget overlays may rely on human impatience as an indicator of a human presence at the user interface. Overlay effects may therefore stimulate additional events, e.g. mouse clicks, to speed up invoking the widget behavior. An example of an overlay effect may be where a click anywhere on a button initiates a gradual colored "fill" of the button, for example beginning at the location of the click and moving outward to the edges of the button. A second click on the button may increase the fill rate, e.g. either filling the button more rapidly or instantaneously. Alternatively, a second click could begin another origin point for the color fill. The effect ends when the button is filled with the color. Optionally, the fill rate can decrease based on the distance of the click from the origin to more likely elicit an impatience-based re-click.

In one embodiment, an active sub-area within a widget button can be revealed, e.g. by color, when the user makes a first click. The user may click again directly on the colored sub-area to end the effect, otherwise the effect ends after a short wait.

Other widget overlay effects may include cycling through colors on a radio button with the cycle speed gradually slowing down until a second click ends the effect or the cycle is completed. Spinning markers within a checkbox may be provided in a similar manner.

Figure 6:
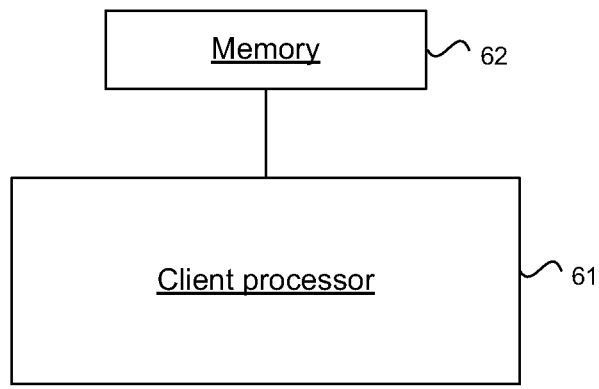
FIG. 6 illustrates a processor and memory of client browser.
Figure 7:
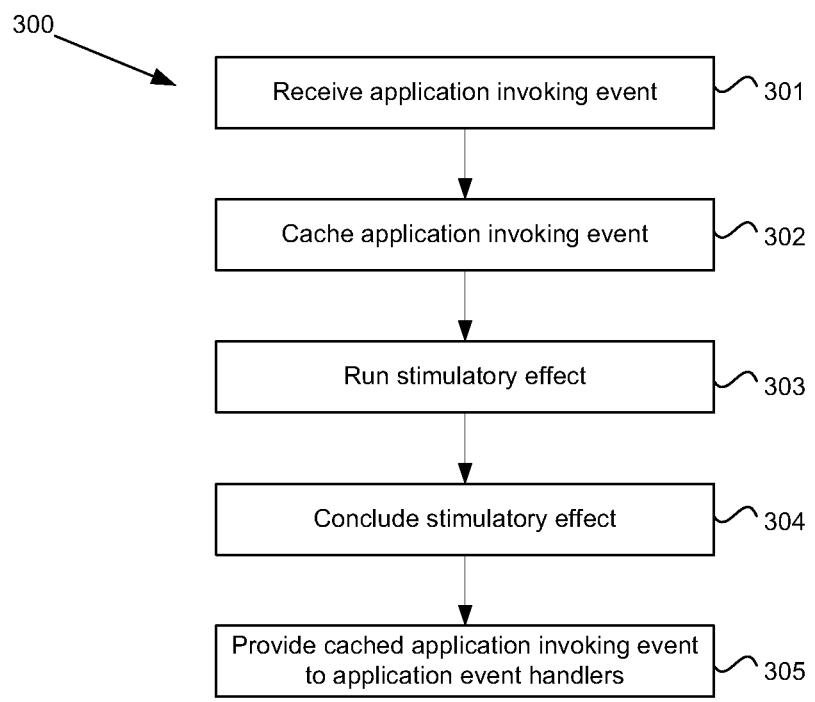
FIG. 7 illustrates an instruction set that may be executed on the processor and memory of FIG. 6.

The components of the system 10 may be embodied in hardware, software, firmware or a combination of hardware, software and/or firmware. In a hardware embodiment, the client browser 15 may be provided in a device, such as a computer, etc including a processor 61 operatively associated with a memory 62 as shown in FIG. 6. The memory 62 may store instructions that are executable on the processor 61. An instruction set 300 that may be executed on the client browser processor 61 is depicted in the flowchart of FIG. 7. Specifically, when executed, the instruction set 300 allows the processor to receive an application invoking event 301 and cache the application invoking event 302. The processor 61 then executes a stimulatory effect 303 to produce a time delay and potentially invoke a response behavior from a user. The processor concludes the stimulatory effect 304, e.g. after the time delay or after a response behavior is received, and then provides the cached application invoking event to an application event handler 305.

Figure 8:
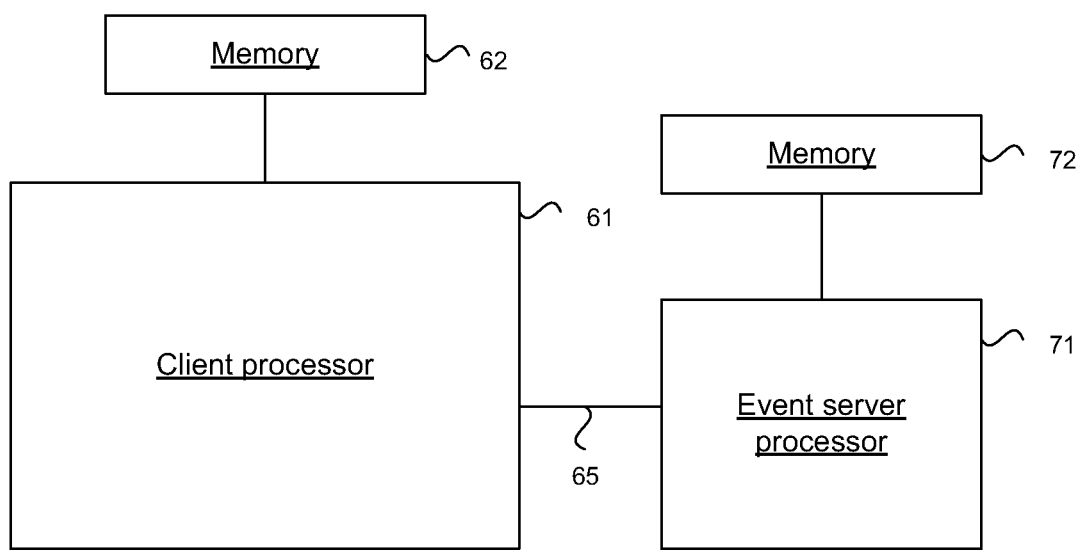
FIG. 8 illustrates the processor and memory of FIG. 6 in association with a processor and memory of an event server.

As shown in FIG. 8, the client browser processor 61 may communicate with further processors, such as an event server processor 71 with associated memory 72, through a suitable communications link 65. Through the communications link, the event server processor may provide overlay requests to the client browser processor 61 and in response, receive event streams containing overlay response events for analysis.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for invoking a response behavior in a web page comprising:
   recording an application invoking event for an application;
   providing a time delay in response to the application invoking event before invoking of the application; and
   providing a stimulatory effect during the delay, the stimulatory effect configured to stimulate a human user to re-perform the application invoking event, the time delay being shortened in response to re-performing of the application invoking event; and
   invoking the application at the conclusion of the time delay irrespective of whether or not the application invoking event is re-performed.

2. The method according to claim 1 comprising:
   receiving at least one further application invoking event for the application;
   concluding the stimulatory effect; and
   invoking the application.

3. The method according to claim 2 comprising recording the at least one further application invoking event.

4. The method according to claim 3 comprising analyzing the at least one further application invoking event to determine if the at least one further application invoking event comprises an expected response behavior.

5. The method according to claim 3 comprising providing the at least one further application invoking event to an event server.

6. The method according to claim 2 comprising caching an original application invoking event during the time delay.

7. The method according to claim 6 comprising providing the original application invoking event to an application event handler associated with the application after the conclusion of the stimulatory effect.

8. The method according to claim 1 wherein providing the stimulatory effect comprises altering the behavior of a button used to invoke the application.

9. The method according to claim 8 wherein altering the behavior of the button used to invoke the application comprises providing a visual effect to the button.

10. The method according to claim 1 comprising:
    locating at least one widget within the web page; and
    modifying event handler behavior for the widget to invoke the stimulatory effect prior to invoking the behavior.

11. A web server embodied in hardware and configured to:
    generate a web page comprising:
    web page content comprising at least one widget; and
    at least one widget overlay module configured to:
    locate the at least one widget within the web page content; and reconfigure event handlers on the at least one widget to first invoke an overlay event handler; and provide the web page to a client browser;

wherein the web page is configured to record an event invoking at least one widget;

wherein the overlay event handler is configured to invoke at least one widget overlay effect prior to the at least one widget being invoked;

wherein the at least one widget overlay effect comprises a visual time delay effect that stimulates a human user to re-perform the event invoking at least one widget, wherein the time delay is shortened in response to re-performing of the event invoking at least one widget and wherein the widget is invoked at the conclusion of the time delay irrespective of whether or not the event invoking at least one widget is re-performed.

12. The web server according to claim 11 wherein the at least one widget overlay module comprises a cache for storing the event during the at least one widget overlay effect.

13. The web server according to claim 11 comprising:

an event observer module configured to:

observe a plurality of events on the web page; and provide an event stream comprising the plurality of events to an event server;

wherein the event stream comprises at least one event recorded during the at least one widget overlay effect.

14. The web server according to claim 13 wherein the at least one widget overlay module is configured to invoke the at least one widget overlay effect in response to a request from the event server.

15. A non-transitory computer-readable medium comprising computer-executable instructions for execution by a processor, that, when executed, cause the processor to:

receive an application invoking event;

cache the application invoking event;

run a stimulatory effect that stimulates a human user to re-perform the application invoking event;

conclude the stimulatory effect; and provide the cached application invoking event to an application event handler at the conclusion of the stimulatory effect irrespective of whether application invoking event was re-performed during the stimulatory effect.

16. The non-transitory computer-readable medium according to claim 15 wherein concluding the stimulatory effect comprises receiving at least one further application invoking event.

17. The non-transitory computer-readable medium according to claim 15 wherein concluding the stimulatory effect comprises concluding a time delay of the stimulatory effect.

* * * * *